Oct. 29, 1940.   P. M. HAFFCKE   2,219,309
THERMIONIC DEVICE
Filed Feb. 8, 1937   3 Sheets-Sheet 1
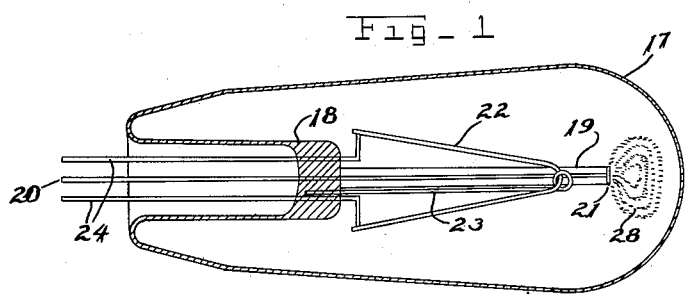
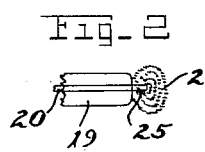 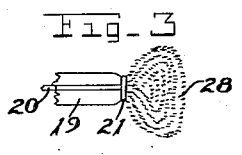 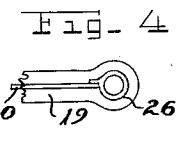
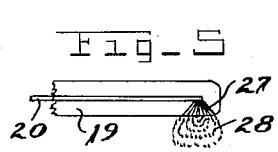 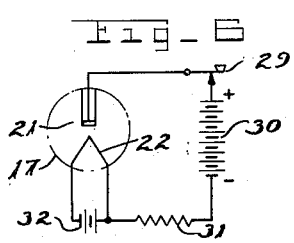
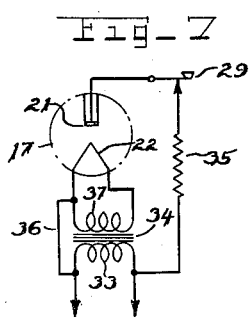 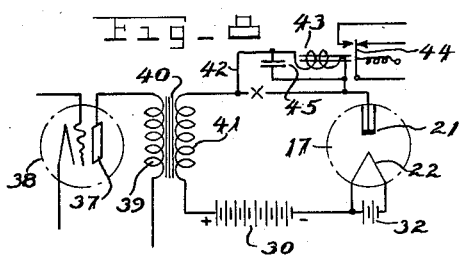
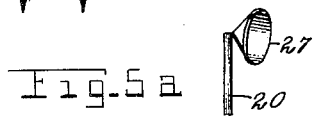
INVENTOR
PHILIP M. HAFFCKE
BY
*Robert A. Lavender*
ATTORNEY Oct. 29, 1940.　　P. M. HAFFCKE　　2,219,309
THERMIONIC DEVICE
Filed Feb. 8, 1937　　3 Sheets-Sheet 2
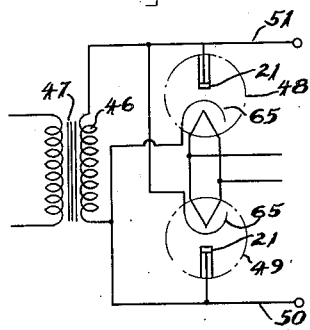
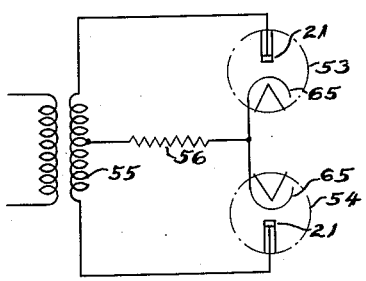
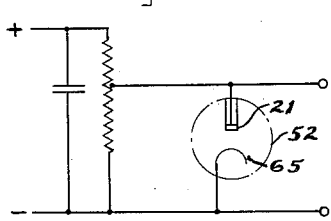
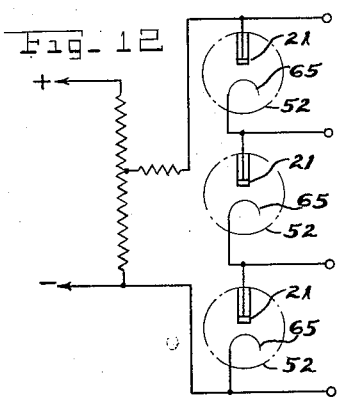
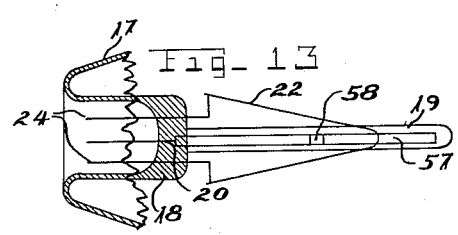
INVENTOR
PHILIP M. HAFFCKE
BY
ATTORNEY Patented Oct. 29, 1940

2,219,309

UNITED STATES PATENT OFFICE 2,219,309

THERMIONIC DEVICE

Philip M. Haffcke, Washington, D. C.

Application February 8, 1937, Serial No. 124,793

14 Claims. (Cl. 176—122)

(Granted under the act of March 3, 1883, as amended April 30, 1928; 370 O. G. 757)

This invention relates to a new and novel thermionic device of the general type containing an ionizable gas.

It is an object of my invention to produce a device of the type mentioned that may be used as a source of light and which may be lighted and extinguished at a very rapid rate. Another object is to produce a device of the type mentioned that will operate at lower voltages than functionally related devices using a cold cathode. A further object is to produce a device of this type suitable for regulating voltages lower than is possible with known types of glow tubes using a cold cathode and a catalyzer such as sodium, potassium, and other alkaline metals. A still further object is to produce a light source wherein the luminous body is of restricted volume.

In the drawings:

Fig. 1 is a view of one embodiment of my invention wherein the anode is a disc;

Fig. 2 illustrates an anode in the form of a short exposed length of wire, suitable for use in the practice of my invention;

Fig. 3 is an enlarged detail view of an anode like that shown in Fig. 1;

Fig. 4 shows an anode in the form of a cylinder open at its ends;

Figure 14:
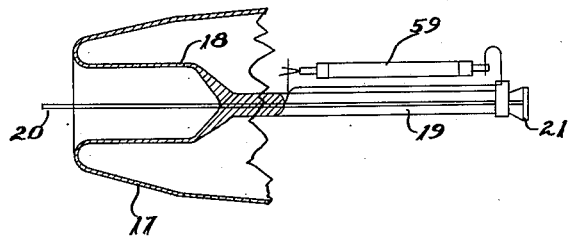
Figure 15:
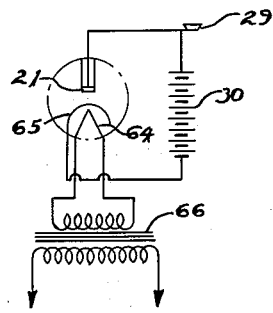
Figure 16:
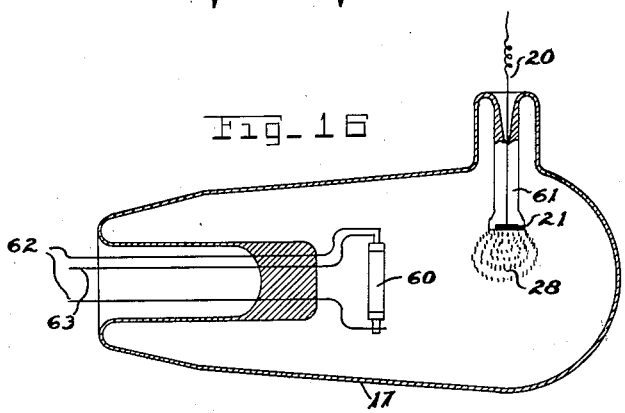

Fig. 5 discloses a conical anode;

Fig. 5a is an enlarged detail view of the anode in Fig. 5;

Fig. 6 illustrates the use of my invention when keyed for code signalling with direct current;

Fig. 7 shows my invention keyed for signalling with alternating current;

Fig. 8 discloses my invention utilized in a code receiver to operate a relay;

Fig. 9 shows two of my tubes connected in an alternating current circuit for voltage regulation;

Fig. 10 shows the use of two of my tubes as a full wave rectifier;

Fig. 11 illustrates its use as a voltage regulator in a direct current circuit;

Fig. 12 shows a plurality of my tubes in series for regulating voltages higher than the capacity of one tube to handle;

Fig. 13 shows a form of anode adapted for heating dissipation;

Fig. 14 shows a construction using an indirectly heated cathode;

Fig. 15 shows the use of indirect heating of a cathode to keep alternating current effects out of the tube;

Fig. 16 shows a tube with the anode mounted to one side thereof and an indirectly heated cathode.

I have found that when a suitable hot electron emitter or cathode is enclosed in an atmosphere of gas or vapor such as neon, argon, mercury vapor, and the like, at a suitable pressure and when the area of the anode is restricted to a small point, that the electrons given off by the emitter will, when a moderate voltage of, say, 25 to 30 volts is impressed between cathode and anode, cause ionization of the gas in the zone near to the anode and this ionization is capable of emitting a useful amount of light for various purposes. The color of this light corresponds to the normal positive column of the gas or vapor used and may be varied in brilliancy within very wide limits by the mere controlling of the current flowing between anode and cathode.

I also find that the difference between the ignition and extinguishing voltages is very greatly reduced as compared with other types of glow lamps, being 5 volts or less to trigger the light in and out of operation reliably.

Fig. 1 illustrates one embodiment of the present invention that has been used and found to be satisfactory. The envelope 17 will be of glass or other transparent material having suitable characteristics when the device is to be used as a source of light. However, when it is used for rectification or voltage regulation it is obvious that the envelope need not transmit the light. The base 18 supports an insulating stem 19 through which passes the anode lead 20. As shown in Figs. 1 and 3 the anode 21 is a disc of approximately the same diameter as is the stem 19 and is connected to the lead 20. The cathode 22 is supported by a member 23 which has one end imbedded in the base 18, the current for the cathode being supplied through leads 24. The envelope 17 is exhausted, the filament or cathode surface is activated and then a small quantity of an inert gas such as neon or argon is admitted until the pressure in the tube is preferably not more than 15 millimeters nor less than 1 micron of mercury and the tube is sealed off.

In operation, the cathode is heated to such temperature as will cause the required electron emission and voltages are impressed on the anode 21 to the normal ionization voltage of the gas in the tube and there then appears a visible, but slight, glow upon the surface of the anode. As the voltage is increased slightly there appears a luminous globoid around the anode that extends, however, beyond the periphery of the anode. This glow will increase in size and brilliancy until the current flowing through the anode circuit requires more electrons than are supplied by the hot emitting surface of the cathode. When this occurs the glow will quickly and progressively extend toward and envelop the cathode and streaks of light will be visible extending from one or more points on the filament and oftentimes to the walls of the bulb. In this condition the ionic bombardment becomes very destructive to the cathode surface. The anode current should, therefore, be maintained below the maximum that can be passed by the electrons supplied by the cathode. Once the ball of light is established, the voltage drop through the anode circuit within the tube remains substantially constant even though the current is varied over limits of 100 to 1. As a specific example, this voltage drop is around 25 volts when neon is the gas used in the tube.

Various forms of anodes that I have tried and found to operate successfully are shown in Figs. 2 to 5. In Fig. 2 the anode 25 is merely a part of the anode lead that is exposed for a length of 1/16 to 1/8 of an inch, the wire being about .005 of an inch in diameter. In Fig. 3 the anode 21 is as described above in connection with Fig. 1. The anode 26 in Fig. 4 is a metal cylinder having only its inner surface exposed, the insulating material of the stem 19 being extended around the outside thereof. In Fig. 5 the anode 27 is a cone of metal embedded in the insulating material of stem 19 and with its inner surface exposed to constitute the active surface of the anode.

I have found that the size of the luminous body varies somewhat with the pressure in the bulb, the greater the pressure the smaller the volume of the luminous body and to a certain extent the greater its luminous intensity. The reduction of pressure causes opposite changes until, when the critical value is reached, the glow becomes extinguished unless the applied voltage is greatly increased.

My invention is of great utility for code signalling purposes, the luminous body 28 being placed at the focus of a parabolic reflector, and the light is visible over almost as great distance as though a filament type of lamp were used, with the added advantage that when the gas in the tube is neon, the light is visible even in bright sunlight.

The keying circuit for using my invention for code signalling is shown in Fig. 6, wherein a common telegraph transmitter key 29 is connected in series with a battery 30, ballast resistance 31, anode 21 and cathode 22. The filament supply battery 32 may be of 2 to 6 volts, while battery 30 need not be more than a few volts (usually about 5 volts) more than is required for the drop through the lamp. Owing to the fact that the luminous body 28 is established and extinguished almost instantaneously, and the further fact that the voltage of establishment of the luminous body and the voltage at which it extinguishes are practically identical, my present invention is very well adapted for code signalling purposes.

Fig. 7 discloses my invention keyed for code signalling with alternating current. One side of the primary 33 of transformer 34 is connected through resistance 35 and key 29 to anode 21, while the other side of the primary 33 is connected to cathode 22 by wire 36. The current for heating the cathode is derived from secondary 37. In this application, the tube becomes a rectifier and is lighted during the half wave only when the positive potential is applied to the anode.

Fig. 8 discloses my novel tube connected to the last audio frequency stage of a code receiver. The output of plate 37 of amplifying triode 38 is fed into primary 39 of transformer 40, the secondary 41 of the transformer being connected to anode 21 and cathode 22 of one of my novel tubes. The voltage of battery 30 is either one or two volts more or less than the voltage required for constant illumination of the tube and the alternating current signal supplied by the transformer 40 is added to or subtracted from the voltage of battery 30 to cause illumination or extinction of the tube depending upon whether the voltage of battery 30 is somewhat higher than or somewhat less than the voltage of constant illumination.

It will be apparent from the foregoing that the very rapid illumination and extinction of my tube adapts it for use as a source of light for television, the modulation for half tones in the reproduction of a picture being effected by changing the current therethrough.

Still another very practical use for this type of lamp is as a source of stroboscopic light. It becomes an important factor in some cases that the lamp may be made very portable and yet safe to handle by the novice. Other types of stroboscopic lamps are usually ignited by a high voltage spark or surge whereas my type of lamp requires maximum voltages of less than 50 volts over all and is thus as safe for the uninitiated to handle as an ordinary extension cord lamp. Such a system is simple and the portable lamp, socket and 3 wire cord to feed the lamp would be no more cumbersome than any other extension lamp such as used by mechanics. With its use, the motion of valve stems, springs, and other moving elements can be visually stopped in any position when the timing of the contacts is in synchronism with the moving part to be viewed.

The simplicity of the lamp makes it practical from a manufacturing standpoint as the gas pressure can vary over quite wide limits without the tube becoming inoperative.

When in place of using neon or other gases, a vapor such as mercury is preferred, the light emitted is characteristic to that vapor and the voltage drop measured across the tube will also be characteristic to that vapor. For instance, with mercury vapor this voltage drop will measure between 12 and 15 volts and the battery need only supply approximately 20 volts through the resistor of Fig. 6.

The circuit shown in Fig. 8 is adapted for use as a rectifier to excite a direct current relay. For this purpose the anode circuit is broken at the point marked with an "X" and the transformer 40 is connected by wire 42 to a solenoid 43 that actuates armature 44 of the relay. The solenoid 43 is by-passed by a condenser 45.

Fig. 9 shows two of the tubes used as a voltage regulator or limiter in an alternating current circuit. The secondary 46 of transformer 47 has one terminal connected to anode 21 of the tube 48 and other terminal connected to anode 21 of tube 49, while the cathodes 65 of the tubes are connected to the terminals of secondary 46 opposite to those which their respectively cooperating anodes are connected. When the output voltage of secondary 46 to wires 50 and 51 exceeds the ionization voltage of the tube, the tubes are excited and act as shunts across the output of the transformer. Fig. 11 illustrates the use of my tube as a voltage limiter across a direct circuit, wherein the positive side is connected to anode 21 of tube 52 and the negative side is connected to cathode 65. It is believed the operation in this case is obvious.

In Fig. 10 is shown the use of my tubes as a full wave rectifier, the anodes 21 of tubes 53 and 54 being connected to the opposite terminals of transformer secondary 55 and the cathodes 65 being connected to the midpoint of the secondary 55 through resistance 56.

Fig. 12 shows how a plurality of my tubes may be used in series with each other to serve as a voltage limiter in a circuit where the voltage is in excess of that which one tube can handle. Inasmuch as this figure is merely a modification of Fig. 11 the parts are given the same reference characters as in Fig. 11.

In Fig. 13 I illustrate a method of dissipating heat from the anode. The anode, member 57, is of greater length than in the forms above described and is wholly enclosed in the stem 19 except for a small area 58 which is exposed to function as the anode. The relatively great length of member 57 serves to carry away and dissipate the heat developed at the area 58.

Figs. 14 and 16 illustrate the construction when an indirectly heated cathode is used. In the former, the cathode 59 is mounted alongside stem 19, the construction being in other respects similar to that in Fig. 1. In Fig. 16, the indirectly heated cathode 60 is disposed transversely of the envelope 17 while the stem 61 that supports the anode 21 is mounted on the side of the envelope. The heating current is supplied through leads 62 and the biasing voltage is applied to lead 63.

Fig. 15 illustrates how my tube would be keyed when an indirectly heated cathode is used to avoid the effects of alternating current used to heat the filament 64. The anode 21 is connected to cathode 65 through key 29 and battery 30, while the filament heating current is supplied by transformer 66.

All in all, as a voltage regulator, my new type of lamp acts similar to the cold cathode gaseous discharge device wherein the cathode fall voltage of the cold cathode type is eliminated and the hang-over between ignition and quenching voltages has been reduced to a negligible minimum for most requirements.

I find that the distance between the nearest point on the cathode surface and the anode should be greater than the mean free path of the electrons in the gas used at the pressure desired. Otherwise, a greatly increased anode voltage will be required for operation.

The anode must not be placed too close to the wall of the envelope if reliable operation is to be insured and the luminous body 28 is to remain in the globoidal form shown. The area required for the anode in this type of tube, although comparatively unimportant for moderate currents such as 25 to 30 milliamperes or less, begins to play a more or less important part from a constructional point of view when currents of 50 milliamperes or above are used. The size of anode specified in connection with Fig. 2 is satisfactory for the lower range of currents but for larger currents, that shown in Fig. 3, where the diameter may be $\frac{3}{16}$ of an inch, is more satisfactory. The current values above mentioned with respect to anode areas apply to continuous duty although instantaneous values may be greatly in excess thereof with safety. The increased area for the heavier currents is required due to the heating under the heavy bombardment of electrons upon the anode.

The invention herein described and claimed may be used and/or manufactured by or for the Government of the United States of America for governmental purposes without the payment of any royalties thereon or therefor.

I claim:

1. A method of producing light, which comprises the steps of freeing electrons, by heat, in a body of ionizable gas at low pressure, providing a zone of positive potential of restricted extent within said body at a distance from the nearest point of liberation of electrons not substantially less than the mean free path of electrons in the gas used and at the pressure existing in said body and maintaining the current transferred by said electrons in such relation to the rate of emission of electrons that luminosity is entirely restricted to a zone adjacent said zone of positive potential.

2. A method of producing light, which comprises the steps of freeing electrons, by heat, in a body of ionizable gas at low pressure, providing a zone of positive potential of restricted extent within said body, said zone being so spaced from the points of liberation of said electrons as to inhibit the formation of a positive column and maintaining the current transferred by said electrons at such value, with respect to the rate of emission of electrons, that no cathode glow is produced.

3. A device of the class described, comprising an insulating stem, a conductive lead in said stem, a disk shaped anode of substantially the same diameter as said stem seated against the end of said stem and connected to said lead, a cathode constituted to emit electrons when heated, a light-permeable envelope enclosing and supporting all of said elements and spaced from said anode and said cathode and a suitable ionizable gas within said envelope under a pressure between fifteen millimeters and one micron of mercury, the least distance between said anode and any part of said cathode being not substantially less than the mean free path of the electrons in the gas used, at the pressure existing in said envelope.

4. A device of the class described, comprising an insulating stem, a conductive lead in said stem, a disk shaped anode of substantially the same diameter as said stem seated against the end of said stem and connected to said lead, a cathode constituted to emit electrons when heated, an envelope enclosing and supporting all of said elements and spaced from said anode and said cathode, and a suitable ionizable gas within said envelope under a pressure between fifteen millimeters and one micron of mercury, the least distance between said anode and any part of said cathode being not substantially less than the mean free path of the electrons in the gas used, at the pressure existing in said envelope.

5. A device of the class described, comprising an insulating stem fixed at one end, a conductive lead in said stem, a small portion of said lead being exposed at the other end of said stem to function as an anode, a cathode constituted to emit electrons when heated, a single chamber envelope enclosing and supporting all of said elements and spaced from said anode and said cathode and a suitable ionizable gas within said envelope under a pressure between fifteen millimeters and one micron of mercury, the least distance between said anode and any part of said cathode being not substantially less than the mean free path of the electrons in the gas used, at the pressure existing in said envelope, the exposed surface of said anode being small in comparison with the surficial area of said cathode.

6. A device of the class described, comprising an insulating stem fixed at one end, a conductive lead in said stem, exposed anode means operatively associated with said lead, a cathode constituted to emit electrons when heated, a single chamber envelope enclosing and supporting all of said elements and spaced from said anode and said cathode, and a suitable ionizable gas within said envelope under a pressure between fifteen millimeters and one micron of mercury, the least distance between said anode and any part of said cathode being not substantially less than the mean free path of the electrons in the gas used, at the pressure existing in said envelope, said cathode having a surficial area at least as great as the active exposed surface of said anode.

7. A device of the class described, comprising an insulating stem, a conductive lead in said stem, a disk shaped anode of substantially the same diameter as said stem seated against the end of said stem and connected to said lead, a cathode constituted to emit electrons when heated, a light-permeable envelope enclosing and supporting all of said elements and spaced from said anode and said cathode, and a suitable ionizable gas within said envelope under low pressure, the least distance between said anode and any part of said cathode being not substantially less than the mean free path of the electrons in the gas used, at the pressure existing in said envelope.

8. A device of the class described, comprising an insulating stem, a conductive lead in said stem, a disk shaped anode of substantially the same diameter as said stem seated against the end of said stem and connected to said lead, a cathode constituted to emit electrons when heated, an envelope enclosing and supporting all of said elements and spaced from said anode and said cathode, and a suitable ionizable gas within said envelope under low pressure, the least distance between said anode and any part of said cathode being not substantially less than the mean free path of the electrons in the gas used, at the pressure existing in said envelope.

9. A device of the class described, comprising an insulating stem fixed at one end, a conductive lead in said stem, a small portion of said lead being exposed to function as an anode, a cathode constituted to emit electrons when heated, a single chamber envelope enclosing and supporting all of said elements and spaced from said anode and said cathode and a suitable ionizable gas within said envelope under low pressure, the least distance between said anode and any part of said cathode being not substantially less than the mean free path of the electrons in the gas used, at the pressure existing in said envelope, said cathode having a surficial area at least as great as the exposed active area of said anode.

10. A device of the class described, comprising an insulating stem fixed at one end, a conductive lead in said stem, a hollow anode connected to said lead and having an open end, the axis of said anode lying transversely to said lead, a cathode constituted to emit electrons when heated disposed alongside said stem from adjacent said fixed end but stopping short of said anode, an envelope enclosing and supporting all of said elements and spaced from said anode and said cathode, and a suitable ionizable gas within said envelope under low pressure, the least distance between said anode and any part of said cathode being not substantially less than the mean free path of the electrons in the gas used, at the pressure existing in said envelope.

11. A device of the class described, comprising an insulating stem fixed at one end, a conductive lead in said stem, exposed anode means operatively associated with said lead, a cathode constituted to emit electrons when heated disposed alongside said stem from adjacent said fixed end but stopping short of said anode, an envelope enclosing and supporting all of said elements and spaced from said anode and said cathode, and a suitable ionizable gas within said envelope under low pressure, the least distance between said anode and any part of said cathode being not substantially less than the mean free path of the electrons in the gas used, at the pressure existing in said envelope, said anode being disposed to face away from said cathode.

12. A device of the class described, comprising an insulating stem, a conductive lead in said stem, a disk shaped anode of substantially the same diameter as said stem seated against the end of said stem and connected to said lead, a cathode constituted to emit electrons when heated, an envelope enclosing and supporting all of said elements and spaced from said anode and said cathode, and a suitable ionizable gas within said envelope under low pressure.

13. A device of the class described, comprising an insulating stem, a conductive lead in said stem, a conical hollow anode connected to said lead at the apex of the anode and having an open end, the axis of said anode lying transversely to said lead, a cathode constituted to emit electrons when heated disposed alongside said stem from adjacent said fixed end but stopping short of said anode, an envelope enclosing and supporting all of said elements and spaced from said anode and said cathode, and a suitable ionizable gas within said envelope under low pressure.

14. A device of the class described, comprising an insulating stem fixed at one end, a conductive lead in said stem, exposed anode means operatively associated with said lead adjacent the other end of said stem, a cathode constituted to emit electrons when heated disposed alongside said stem with the plane of its axis substantially parallel to the length of said stem but stopping short of said anode, an envelope enclosing and supporting all of said elements and spaced from said anode and said cathode, and a suitable ionizable gas within said envelope under low pressure, said anode being disposed to face away from said cathode.

PHILIP M. HAFFCKE.